United States Patent
Amir et al.

(10) Patent No.: US 12,186,885 B2
(45) Date of Patent: Jan. 7, 2025

(54) DEVICE FOR PERFORMING EMOTIONAL GESTURES TO INTERACT WITH A USER

(71) Applicant: Intuition Robotics, Ltd., Ramat-Gan (IL)

(72) Inventors: Roy Amir, Mikhmoret (IL); Itai Mendelsohn, Tel Aviv-Jaffa (IL); Dor Skuler, Oranit (IL); Shlomi Azoulay, Tel Aviv-Jaffa (IL); Itai Perez, Tel Aviv (IL)

(73) Assignee: Intuition Robotics, Ltd, Ramat-Gan (IL)

( * ) Notice: Subject to any disclaimer, the term of this patent is extended or adjusted under 35 U.S.C. 154(b) by 917 days.

(21) Appl. No.: 16/507,599

(22) Filed: Jul. 10, 2019

(65) Prior Publication Data

US 2019/0329416 A1    Oct. 31, 2019

Related U.S. Application Data

(63) Continuation of application No. PCT/US2018/012922, filed on Jan. 9, 2018.
(Continued)

(51) Int. Cl.
*B25J 11/00* (2006.01)
*B25J 13/08* (2006.01)
(Continued)

(52) U.S. Cl.
CPC ............ *B25J 11/001* (2013.01); *H04L 51/10* (2013.01); *B25J 13/003* (2013.01); *B25J 13/081* (2013.01); *B25J 13/086* (2013.01); *B25J 13/087* (2013.01)

(58) Field of Classification Search
CPC ....... H04L 51/10; B25J 11/001; B25J 13/003; B25J 13/087; B25J 13/086; B25J 13/081; G06F 3/011; G06F 2203/011
See application file for complete search history.

(56) References Cited

U.S. PATENT DOCUMENTS

| 5,700,178 A | * | 12/1997 | Cimerman | ............... | A63H 3/28 446/341 |
| 2004/0185746 A1 | * | 9/2004 | Kaneko | ................. | A63H 33/26 446/384 |

(Continued)

FOREIGN PATENT DOCUMENTS

| EP | 2933068 A1 | 10/2015 |
| JP | S6372969 A | 4/1988 |

(Continued)

OTHER PUBLICATIONS

The First Office Action for Japanese Patent Application No. 2019-557533 in the name of Intuition Robotics, Issued Aug. 4, 2021.
(Continued)

*Primary Examiner* — Stephen Holwerda
(74) *Attorney, Agent, or Firm* — M&B IP Analysts, LLC (57) ABSTRACT

A device for performing emotional gestures to interact with a user. The device includes a base; a controller; a first body portion pivotally connected to the base, the first body portion having a first aperture; an electro-mechanical member disposed within the first body portion and connected to the controller; and a second body portion connected to the electro-mechanical member, the second body portion having a second aperture. The electro-mechanical member is configured to extend from the first body portion through the first aperture to the second body portion through the second aperture and the controller is configured to control movements of the electro-mechanical member and the first body portion, where the movements include emotional gestures.

12 Claims, 6 Drawing Sheets

Related U.S. Application Data (60) Provisional application No. 62/444,384, filed on Jan. 10, 2017, provisional application No. 62/444,386, filed on Jan. 10, 2017.

(51) Int. Cl.
*H04L 51/10* (2022.01)
*B25J 13/00* (2006.01)

(56) References Cited

U.S. PATENT DOCUMENTS

| | | | |
|---|---|---|---|
| 2005/0125098 A1* | 6/2005 | Wang | G05D 1/0246 |
| | | | 700/245 |
| 2006/0293787 A1 | 12/2006 | Kanda et al. | |
| 2011/0014848 A1* | 1/2011 | Law | A63H 13/00 |
| | | | 446/330 |
| 2012/0044683 A1* | 2/2012 | Tong | F21S 4/15 |
| | | | 29/428 |
| 2012/0245925 A1 | 9/2012 | Guha et al. | |
| 2013/0175816 A1 | 7/2013 | Kawasaki et al. | |
| 2013/0206488 A1 | 8/2013 | Horinouchi | |
| 2013/0268119 A1* | 10/2013 | Weinberg | B25J 11/0005 |
| | | | 700/264 |
| 2014/0188276 A1 | 7/2014 | Roseway et al. | |
| 2016/0364002 A1 | 12/2016 | Gates et al. | |

FOREIGN PATENT DOCUMENTS

| | | |
|---|---|---|
| JP | 2003071761 A | 3/2003 |
| JP | 2003145476 A | 5/2003 |
| JP | 2004214895 A | 7/2004 |
| JP | 2007069302 A | 3/2007 |
| JP | 2012166325 A | 9/2012 |
| WO | 2015158884 A3 | 12/2015 |
| WO | 2015185748 A1 | 12/2015 |

OTHER PUBLICATIONS

Aldebaran, "Pepper Press Kit", Softbank Pepper Robot Overview, Robotlab.com, 2015.

The European Search Report for EP Application No. 18738520.8 dated Jul. 21, 2020, EPO/DE, Munich, Germany.

The International Search Report and The Written Opinion for PCT/US2018/012922, May 8, 2018, EPO, Moscow, Russia.

The International Search Report and The Written Opinion for PCT/US2018/012923, Jun. 4, 2018, ISA/RU, Moscow, Russia.

The First Office Action for Chinese Application No. 201880009138.4, issued: Jan. 21, 2022, Chinese Intellectual Property Administration.

* cited by examiner

DEVICE FOR PERFORMING EMOTIONAL GESTURES TO INTERACT WITH A USER

CROSS-REFERENCE TO RELATED APPLICATIONS

This application is a continuation of International Application No. PCT/US2018/012922 filed Jan. 9, 2018 which claims the benefit of U.S. Provisional Patent Application No. 62/444,384 and U.S. Provisional Application No. 62/444,386, both filed on Jan. 10, 2017, the contents of which are hereby incorporated by reference.

TECHNICAL FIELD

The present disclosure relates generally to electronic devices, and more specifically to electronic devices designed to perform electro-mechanical gestures that portray particular emotions.

BACKGROUND

Electronic devices, including personal electronic devices such as smartphones, tablet computers, consumer robots, and the like, have been recently designed with ever increasing capabilities. Such capabilities fall within a wide range, including, for example, automatically cleaning or vacuuming a floor, playing high definition video clips, identifying a user by a fingerprint detector, running applications with multiple uses, accessing the internet from various locations, and the like.

In recent years, microelectronics advancement, computer development, control theory development and the availability of electro-mechanical and hydro mechanical servo-mechanisms, among others, have been key factors in robotics evolution, giving rise to a new generation of automatons known as social robots. Social robots can conduct what appears to be emotional and cognitive activities, interacting and communicating with people in a simple and pleasant manner following a series of behaviors, patterns and social norms. Advancements in the field of robotics have included the development of biped robots with human appearances that facilitate interaction between the robots and humans by introducing anthropomorphic human traits in the robots. The robots often include a precise mechanical structure allowing for specific physical locomotion and handling skill.

Although social robots have sensory systems to perceive the surrounding environment and are capable of interacting with human beings, the self-expressions they are currently programmed to display remain limited. Current social robots' performances include simple direct responses to a user's actions. For example, these responses may include performing a movement or series of movements based on predetermined paths. Vacuum robots employ such predetermined paths in order to efficiently maximize coverage of a floor plan and may run based on a user determined schedule. Responses may further include predetermined movements when encountering a known obstacle, which may be employed by biped robots to maneuver a course. However, these responses are difficult to employ when the desired application of the robot is to directly respond to a user's queries or to determine and respond to a user's mood. Without the ability to provide gestures and movements that appear as emotional in nature, robots become less appealing to many users, especially those who are less familiar with robotic technology.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a device for performing emotional gestures to interact with a user. The device includes a base; a controller; a first body portion pivotally connected to the base, the first body portion having a first aperture; an electro-mechanical member disposed within the first body portion and connected to the controller; and a second body portion connected to the electro-mechanical member, the second body portion having a second aperture. The electro-mechanical member is configured to extend from the first body portion through the first aperture to the second body portion through the second aperture and the controller is configured to control movements of the electro-mechanical member and the first body portion, where the movements include emotional gestures.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a device configured to perform and display gestures that may be interpreted as emotional gestures by a user. The device includes a base connected to a first body portion, where the first body portion is rotatable relative to the base. A second body portion is placed above the first body portion and is attached thereto via an electro-mechanical arm.

Figure 1A:
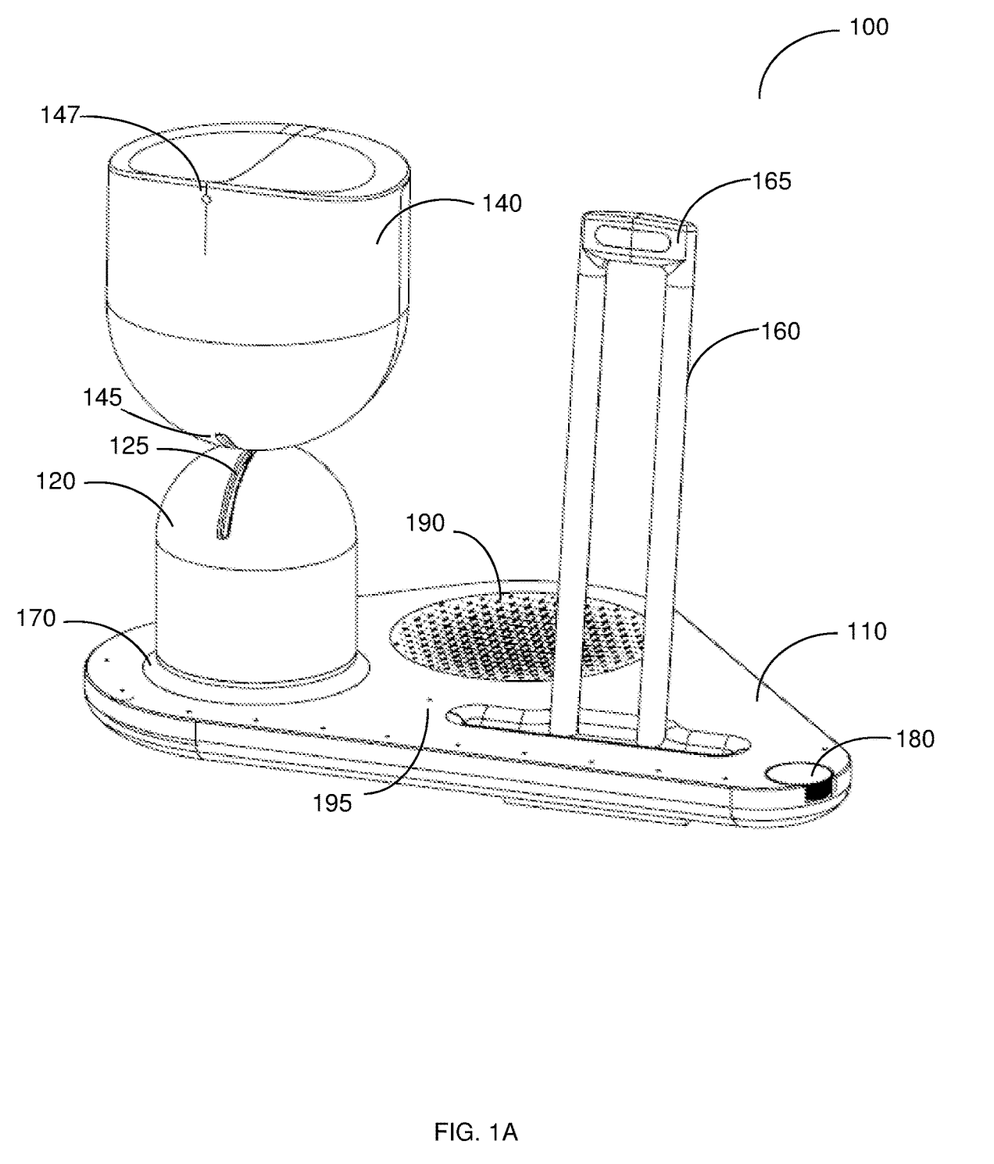
FIG. 1A is a schematic diagram of a device for performing emotional gestures according to an embodiment.

FIG. 1A is an example schematic diagram of a device 100 for performing emotional gestures according to an embodiment. The device 100 comprises a base 110, which may include therein a variety of electronic components, hardware components, and the like. The base 110 may further include a volume control 180, a speaker 190, and a microphone 195.

A first body portion 120 may be mounted to the base 110 within a ring 170 designed to accept the first body portion 120 therein. The first body portion 120 may include a hollow hemisphere mounted above a hollow cylinder, although other appropriate bodies and shapes may be used while having a base configured to fit into the ring 170. A first aperture 125 crossing through the apex of the hemisphere of the first body portion 120 provides access into and out of the hollow interior volume of the first body portion 120. The first body portion 120 is mounted to the base 110 within the confinement of the ring 170 such that it may rotate about its vertical axis symmetry, i.e., an axis extending perpendicular from the base. For example, the first body portion 120 rotates clockwise or counterclockwise relative to the base 110. The rotation of the first body portion 120 about the base 110 may be achieved by, for example, a motor (not shown) mounted to the base 110 or a motor (not shown) mounted within the hollow of the first body portion 120.

The device 100 further includes a second body portion 140. The second body portion 140 may additionally include a hollow hemisphere mounted onto a hollow cylindrical portion, although other appropriate bodies may be used. A second aperture 145 is located at the apex of the hemisphere of the second body portion 140. When assembled, the second aperture 145 is positioned to align with the first aperture 125.

The second body portion 140 is mounted to the first body portion 120 by an electro-mechanical member (not shown in FIG. 1) placed within the hollow of the first body portion 120 and protruding into the hollow of the second body portion 140 through the first aperture 125 and the second aperture 145.

In an embodiment, the electro-mechanical member enables motion of the second body portion 140 with respect of the first body portion 120 in a motion that imitates at least an emotional gesture understandable to a human user. The combined motion of the second body portion 140 with respect of the first body portion 120 and the first body portion 120 with respect to the base 110 is configured to correspond to one or more of a plurality of predetermined emotional gestures capable of being presented by such movement. A head camera assembly 147 may be embedded within the second body portion 140. The head camera assembly 147 comprises at least one image capturing sensor that allows capturing images and videos.

The base 110 may be further equipped with a stand 160 that is designed to provide support to a user device, such as a portable computing device. The stand 160 may include two vertical support pillars that may include therein electronic elements. Example for such elements include wires, sensors, charging cables, wireless charging components, and the like and may be configured to communicatively connect the stand to the user device.

In an embodiment, a camera assembly 165 is embedded within a top side of the stand 160. The camera assembly 165 includes at least one image capturing sensor.

Figure 1B:
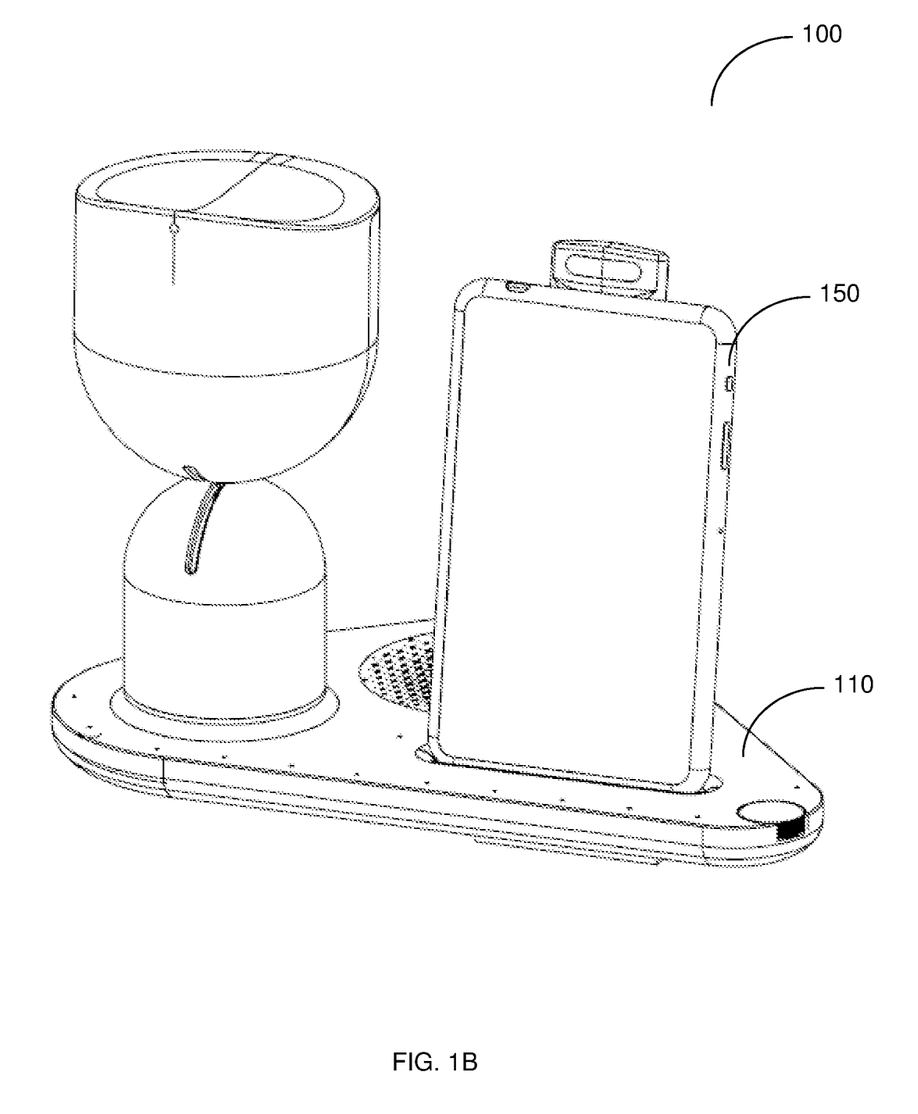
FIG. 1B is a schematic diagram of a device for performing emotional gestures with a user device attached thereto, according to an embodiment.

According to some embodiments, shown in FIG. 1B, a user device 150 is shown supported by the stand 160. The user device 150 may include a portable electronic device including a smartphone, a mobile phone, a tablet computer, a wearable device, and the like. The device 100 is configured to communicate with the user device 150 via a controller (not shown). The user device 150 may further include at least a display unit used to display content, e.g., multimedia. According to an embodiment, the user device 150 may also include sensors, e.g., a camera, a microphone, a light sensor, and the like. The input identified by the sensors of the user device 150 may be relayed to the controller of the device 100 to determine whether one or more electro-mechanical gestures are to be performed.

Returning to FIG. 1A, the device 100 may further include an audio system, including, e.g., a speaker 190. The speaker 190 in one embodiment is embedded in the base 110. The audio system may be utilized to, for example, play music, make alert sounds, play voice messages, and other audio or audiovisual signals generated by the device 100. The microphone 195, being also part of the audio system, may be adapted to receive voice instructions from a user.

The device 100 may further include an illumination system (not shown). Such a system may be implemented using, for example, one or more light emitting diodes (LEDs). The illumination system may be configured to enable the device 100 to support emotional gestures and relay information to a user, e.g., by blinking or displaying a particular color. For example, an incoming message may be indicated on the device by a LED pulsing green light. The LEDs of the illumination system may be placed on the base 110, on the ring 170, or within on the first or second body portions 120, 140 of the device 100.

Emotional gestures understood by humans are, for example and without limitation, gestures such as: slowly tilting a head downward towards a chest in an expression interpreted as being sorry or ashamed; tilting the head to the left of right towards the shoulder as an expression of posing a question; nodding the head upwards and downwards vigorously as indicating enthusiastic agreement; shaking a head from side to side as indicating disagreement, and so on. A profile of a plurality of emotional gestures may be compiled and used by the device 100.

In an embodiment, the device 100 is configured to relay similar emotional gestures by movements of the first body portion 120 and the second body portion 140 relative to each other and to the base 110. The emotional gestures may be predefined movements that mimic or are similar to certain gestures of humans. Further, the device may be configured to direct the gesture toward a particular individual within a room. For example, for an emotional gesture of expressing agreement towards a particular user who is moving from one side of a room to another, the first body portion 120 may perform movements that track the user, such as a rotation about a vertical axis relative to the base 110, while the second body portion 140 may move upwards and downwards relative to the first body portion 120 to mimic a nodding motion.

Figure 2:
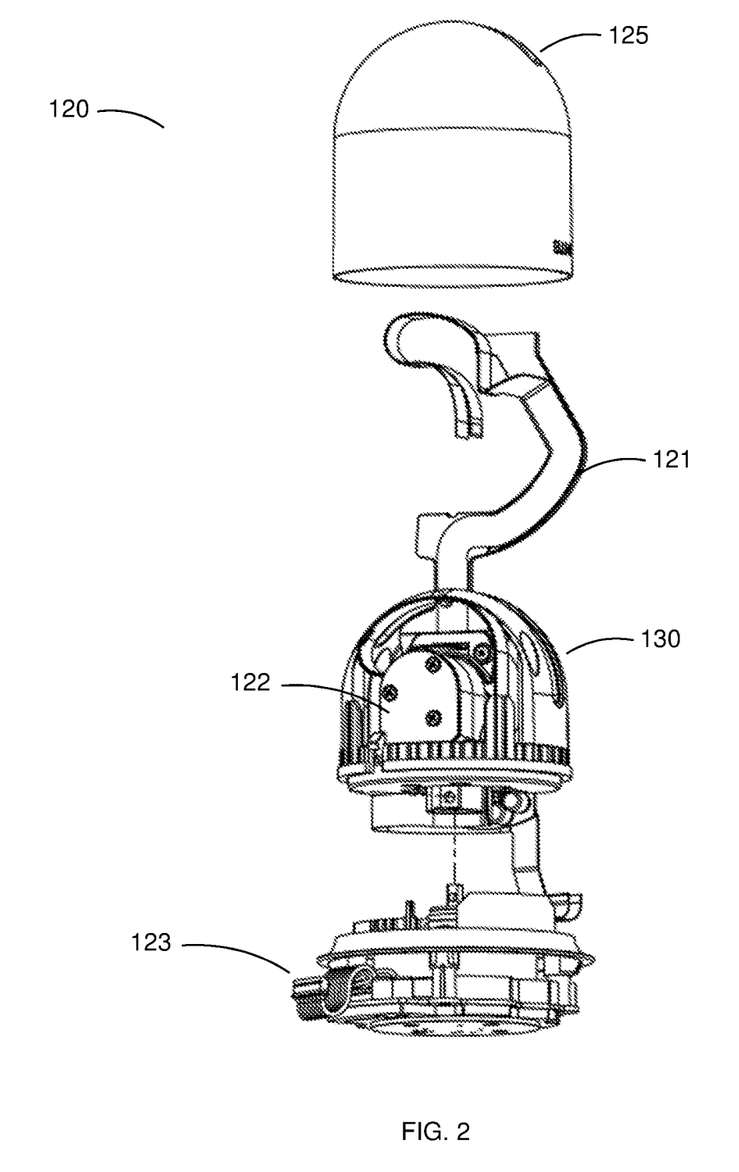
FIG. 2 is an exploded view of the first body portion of the device illustrated in FIGS. 1A and 1B, according to an embodiment.

FIG. 2 shows an example exploded view of the first body portion 120 of the illustrated in FIGS. 1A and 1B, according to an embodiment. The first body portion 120 includes an electro-mechanical member 130 used by the device 100 for performing emotional gestures. The electro-mechanical member 130 is mounted within the hollow of the first body portion 120 and at least partially protrudes through the first aperture 125. The electro-mechanical member 130 may further be connected to the base 110, such that the first body portion 120 may be moved relative thereto.

The electro-mechanical member 130 is configured to control movements of the first body portion 120 and the second body portion 140 and includes an assembly of a plurality of mechanical elements that in combination enable such motion. The plurality of mechanical elements may include a variety of combinations, such as, but not limited to, shafts, axles, pivots, wheels, cogwheels, poles, and belts. The electro-mechanical member 130 may be connected to one or more electric motors (not shown) configured to rotate the first body portion 120 about a vertical axis.

In an example embodiment, the electric motor of the electro-mechanical member 130 may be physically connected to the first body portion 120 by an axis that enables a complete 360-degree spin. In another example embodiment, an arm 121 of the electro-mechanical member 130 may be connected to the electric motor and extend through the first aperture 125 to be physically connected to the second body portion 140 by an axis that enables movement of the second body portion 140 via the arm 121, e.g., moving the second body portion upwards, downwards, forwards, and backwards. The arm 121 may include a narrow portion configured to fit within the first aperture 125 and the second aperture 145, such that the first body portion 120 and second body portion 140 may be connected through the arm 121. Additional components within the first body portion 120 may include a connector 123 adapted to connect the electro-mechanical member 130 to a controller (not shown) within the device 100. In an embodiment, the electric motor is connected to a spring system 122 that is configured to allow for smooth movements of the arm, and, in turn, the second body portion 140, without the use of cogwheels or gears.

The combined movements of the first body portion 120 and the second body portion 140 may be configured to perform diverse emotional gestures. For example, the first body portion 120 may rotate right while the second body portion 140 performs a tilting movement, which may be interpreted as posing a question to a user detected to be positioned to the right of the device 100.

Figure 3:
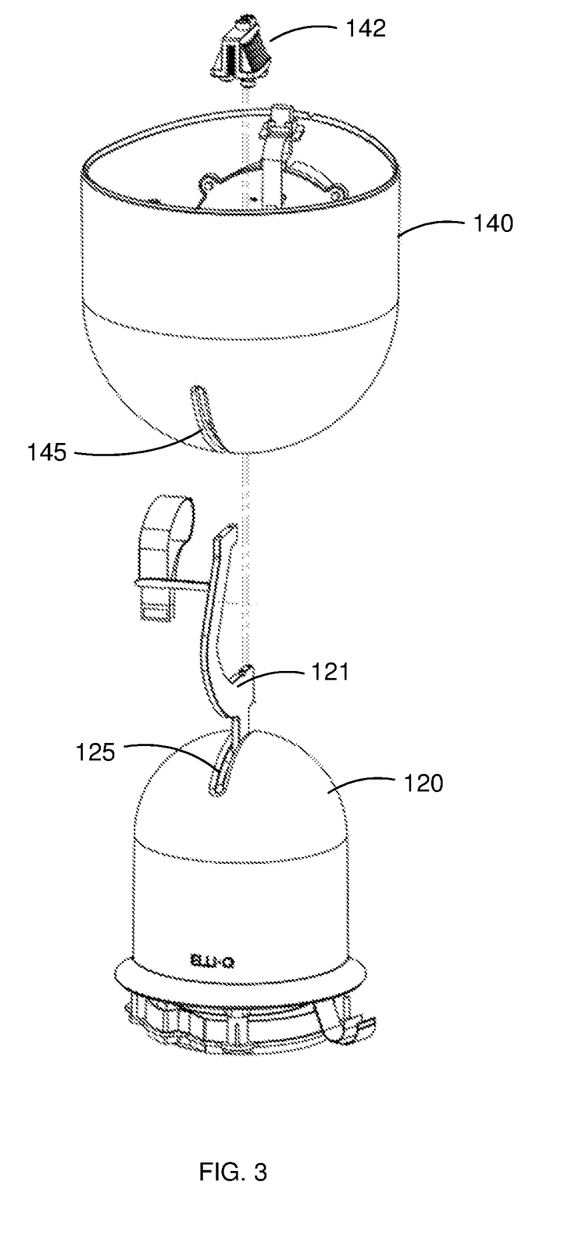
FIG. 3 is a perspective view of the first body portion and the second body portion of the device illustrated in FIGS. 1A and 1B, according to an embodiment.

FIG. 3 is an example perspective view of the first body portion 120 and the second body portion 140 of the device illustrated in FIGS. 1A and 1B, according to an embodiment.

When assembled, the arm 121 protrudes from the first aperture 125 and extends through the second aperture 145. A bearing assembly 142 may be secured to the top of the arm 121 and configured to hold the arm 121 in place within the hollow of the second body portion 140.

Figure 4:
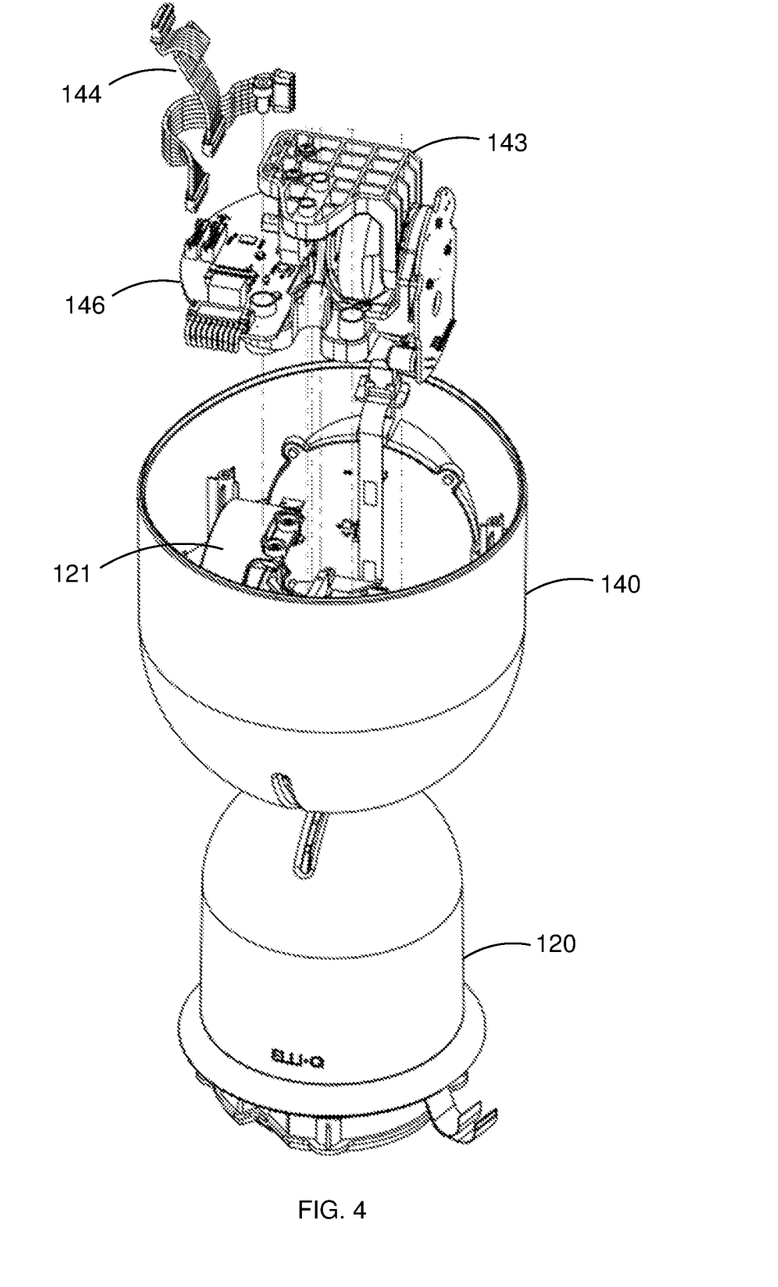
FIG. 4 is an exploded perspective view of the second body portion of the device illustrated in FIGS. 1A and 1B according to an embodiment.

FIG. 4 is an example exploded perspective view of the second body portion 140 of the device for performing emotional gestures according to an embodiment. When fully assembled, the neck 121 extends into the interior volume of the hollow second body portion 140 and is attached thereto. In an embodiment, a head motor assembly 142 is disposed within the second body portion and connected to the neck 121. The head motor assembly 143 may be configured to allow for additional movement of the second body portion 140 with respect to the first body portion 120. A connector 144 allows for a connection between the head motor assembly 143 and a controller (not shown). In an embodiment, a motherboard 146 is in communication with the head motor assembly 143 and the connector 144, and is configured to be controlled via the controller.

Figure 5:
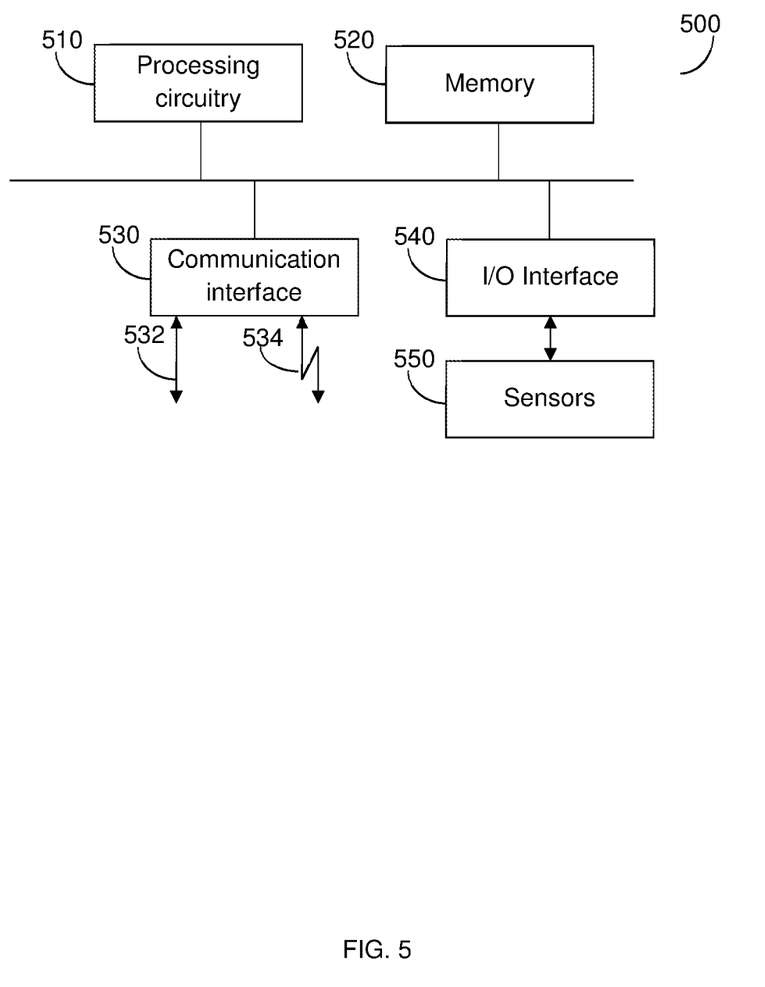
FIG. 5 is a block diagram of a controller for controlling a device for performing emotional gestures.

FIG. 5 is an example block diagram of a controller 500 of the device 100 implemented according to an embodiment. In an embodiment, the controller 500 is disposed within the base 110 of the device 100. In another embodiment, the controller 500 is placed within the hollow of the first body portion 120 or the second body portion 140 of the device 100. The controller 500 includes a processing circuitry 510 that is configured to control at least the motion of the various electro-mechanical segments of the device 100. The processing circuitry 510 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The controller 500 further includes a memory 520. The memory 520 may contain therein instructions that, when executed by the processing circuitry 510, cause the controller 510 to execute actions, such as, performing a motion of one or more portions of the device 100, receive an input from one or more sensors, display a light pattern, and the like. According to an embodiment, the memory 520 may store therein user information, e.g., data associated with a user's behavior pattern. The memory 520 is further configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions cause the processing circuitry 510 to perform the various processes described herein. Specifically, the instructions, when executed, cause the processing circuitry 510 to cause the first body portion 120, the second body portion 140, the electro-mechanical member 130, and the arm 121 of the device 100 to perform emotional gestures as described herein. In a further embodiment, the memory 520 may further include a memory portion (not shown) including the instructions.

The controller 500 further includes a communication interface 530 which is configured to perform wired 532 communications, wireless 534 communications, or both, with external components, such as a wired or wireless network, wired or wireless computing devices, and so on. The communication interface 530 may be configured to communicate with the user device to receive data and instructions therefrom.

The controller 500 may further include an input/output (I/O) interface 540 that may be utilized to control the various electronics of the device 100, such as sensors 550, including sensors on the device 100, sensors on the user device 150, the electro-mechanical member 130, and more. The sensors 550 may include, but are not limited to, environmental sensors, a camera, a microphone, a motion detector, a proximity sensor, a light sensor, a temperature sensor and a touch detector, one of more of which may be configured to sense and identify real-time data associated with a user. For example, a motion detector may sense movement, and a proximity sensor may detect that the movement is within a predetermined distance to the device 100. As a result, instructions may be send to light up the illumination system of the device 100 and raise the second body portion 140, mimicking a gesture indicating attention or interest.

According to an embodiment, the real-time data may be saved and stored within the device 100, e.g., within the memory 520, and may be used as historical data to assist with identifying behavior patterns, changes occur in behavior patterns, and the like.

As a non-limiting example, the controller 500 may determine, based on sensory input from a sensor 550, that a certain emotional gesture is appropriate based on identification of a specific user behavior. As a result, the controller 500 may cause the first body portion 120, the electro-mechanical member 130 and the second body portion 140 to perform one or more movements that may be interpreted by the user as one or more emotional gestures.

Methods implemented by the device 100 may be utilized for several purposes. An example for such a purpose may be performing an electro-mechanical gesture based on a receipt of an electronic message by identification of information based on the electronic message and collection of data with respect to a user's state.

According to another example method, the device 100 may be further utilized to perform an electro-mechanical gesture respective of a receipt of an electronic recommendation. The method may be configured to receive an electronic recommendation, collect data related to the user, analyze the data and the information associated with the recommendation to determine a proactive electro-mechanical gesture associated with at least one emotion. Then, the at least one electro-mechanical gesture is performed. According to another exemplary method executed using the device 100, the device 100 may be configured to respond to detected loneliness of a user.

For example, the device 100 may be configured to detect loneliness of a user using predetermined loneliness profiles based on various parameters including, e.g., identifying the amount of time a user has been stationary watching television, sleeping, sitting in a chair without significant movement, and the like. The controller of the device may be configured to select at least one electro-mechanical gesture from a predetermined set of electro-mechanical gestures based on the detected loneliness profile. The gestures may be adapted for various users. Thus, different users may experience different electro-mechanical gestures from the device based on identical parameters. As an example gesture, where a user is identified as lonely, the electro-mechanical gesture may include rotating the first body portion 120 towards the user, moving the second body portion 140 forward and towards the user, and causing the illumination system to illuminate and the audio system to play music.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A social robot for performing emotional gestures to interact with a user, comprising:
   a base of the social robot;
   a controller operatively coupled to the base and configured to receive inputs from a plurality of sensors;
   a first body portion pivotally connected to the base, the first body portion further comprising a first aperture;
   an electro-mechanical member disposed within the first body portion and connected to the controller; and
   a second body portion connected to the electro-mechanical member, the second body portion further comprising a second aperture;
   wherein the electro-mechanical member is configured to extend from the first body portion through the first aperture to the second body portion through the second aperture;
   wherein the electro-mechanical member further comprises an arm and a spring system coupled to an electric motor, wherein the spring system is structured to allow for smooth movements of the arm and the second body portion; and
   wherein the controller is configured to control movements of the electro-mechanical member and the first body portion based on the inputs from the plurality of sensors, so that the electro-mechanical member enables motion of the second body portion with respect to the first body portion initiating emotional gestures.

2. The device of claim 1, wherein the controller is further configured to control the movements of the second body portion.

3. The device of claim 1, wherein the first body portion is rotatable about an axis extending perpendicular from the base.

4. The device of claim 1, further comprising a stand configured to communicatively connect to a user device.

5. The device of claim 1 further comprising at least one sensor.

6. The device of claim 5, wherein each of the at least one sensor is any one of: an environmental sensor, a camera, a microphone, a motion detector, a proximity sensor, a light sensor, a temperature sensor and a touch detector.

7. The device of claim 1, wherein the controller is further configured to:
   send instructions to the first body portion, the second body portion, and the electro-mechanical member in order to perform an emotional gesture from a predetermined plurality of emotional gestures.

8. The device of claim 1, wherein the second aperture is positioned to align with the first aperture.

9. The device of claim 1, wherein the base further comprises an audio system including at least an audio speaker.

10. The device of claim 1, wherein the first body portion comprises a hemisphere, where the first aperture is disposed at the apex of the hemisphere.

11. The device of claim 1, wherein the second body portion comprises a hemisphere, where the second aperture is disposed at the apex of the hemisphere.

12. The device of claim 1, further comprising an illumination system connected to the controller, the illumination system including at least one light disposed on the device.

\* \* \* \* \*